US008279458B2

(12) United States Patent  (10) Patent No.: US 8,279,458 B2
Brownstein  (45) Date of Patent: Oct. 2, 2012

(54) METHOD AND APPARATUS FOR AN IMAGE COMMUNICATION SYSTEM FOR ORDERING DIGITAL PRINTS

(75) Inventor: Scott Brownstein, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 1015 days.

(21) Appl. No.: 11/676,748

(22) Filed: Feb. 20, 2007

(65) Prior Publication Data

US 2007/0195338 A1  Aug. 23, 2007

Related U.S. Application Data

(60) Provisional application No. 60/774,724, filed on Feb. 17, 2006.

(51) Int. Cl.
*G06K 15/00* (2006.01)
(52) U.S. Cl. .......................... 358/1.12; 358/1.9; 358/537
(58) Field of Classification Search .................. 358/1.1, 358/1.2, 1.18, 302
See application file for complete search history.

(56) References Cited

U.S. PATENT DOCUMENTS

| | | | |
|---|---|---|---|
| 6,504,620 B1 | 1/2003 | Kinjo | |
| 6,532,080 B1 | 3/2003 | Kinjo | |
| 6,590,671 B1 | 7/2003 | Kinjo | |
| 6,967,737 B2 | 11/2005 | Kinjo | |
| 2003/0058457 A1* | 3/2003 | Fredlund et al. | 358/1.2 |
| 2004/0207873 A1 | 10/2004 | Kinjo | |
| 2005/0052685 A1* | 3/2005 | Herf et al. | 358/1.15 |
| 2006/0158463 A1* | 7/2006 | Michlin | 345/634 |
| 2006/0197963 A1* | 9/2006 | Royal et al. | 358/1.2 |

* cited by examiner

*Primary Examiner* — Benny Q Tieu
*Assistant Examiner* — Marcellus Augustin
(74) *Attorney, Agent, or Firm* — Wood Oviatt Gilman LLP

(57) ABSTRACT

An image data communication system provided herein allows a customer to upload and save a digital image data file in a first resolution format to a server of a photofinishing service over a network. The photofinisher establishes a range of print sizes of acceptable quality based on the first resolution of the image data file. When the customer places a print order, the system compares the requested print size to the resolution of the saved image data file. If the requested print size is within the acceptable print quality range, the order is processed and shipped or otherwise made available to the customer. If the requested print size is outside the acceptable quality print range, the customer is notified and given the option of uploading the same image in a second resolution which is higher than the first resolution, after which the photofinisher processes the order using the second resolution.

8 Claims, 2 Drawing Sheets ly, is stored for a mutually agreed upon time (e.g., 60-90 days) to make efficient use of available server memory on an ongoing basis. An image file size is dictated in large part by the image resolution which is typically measured in units of pixels per area. Thus, the higher the resolution, the larger the file size. Furthermore, the larger the file size, the longer it takes a customer to upload the file to the photofinisher server. Additionally, more storage capacity is needed for the storage of higher resolution images. It would therefore be desirable from a customer satisfaction standpoint to require a high resolution image only when necessary for good image quality in the ordered print size and/or product.

METHOD AND APPARATUS FOR AN IMAGE COMMUNICATION SYSTEM FOR ORDERING DIGITAL PRINTS

CROSS-REFERENCE TO RELATED APPLICATIONS

This application claims the benefit of U.S. Provisional Patent Application Ser. No. 60/774,724, filed Feb. 17, 2006.

FIELD OF THE INVENTION

The present invention generally relates to digital image communication systems.

BACKGROUND OF THE INVENTION

Digital photo image processing is a rapidly growing technology area. Digital cameras are in wide use today and a user has many options as to how the digital images are converted to a photograph. For example, the user may simply transfer the image to his/her own printer for printing directly from the digital camera or via a personal computer where the user may modify the image as desired (e.g., crop, improve quality, etc.). Another option currently available is to send the digital image electronically to a service that will print and mail the desired photos or other product having the image thereon (e.g., mugs, blankets, CDs, etc.) back to the user/customer to allow for in-store pickup. The service may also offer a virtual photo album where a customer uploads and stores their digital images for access by him/herself and others who the primary customer desires to have access to the virtual photo album such as family and friends, for example. These "secondary customers" accessing the virtual photo album may then select and order prints and/or other product from the service as desired.

The present invention concerns this second option where a customer uploads their digital images over a network, such as the Internet, to a photofinisher service that will print and mail or otherwise make available for in-store pickup the ordered photos and/or other product to the primary and/or secondary customers.

A typical internet photofinisher service has one or more servers which store customer files comprising one or more digital images that the customer has uploaded to the server. The image data may be stored indefinitely or, more typically, is stored for a mutually agreed upon time (e.g., 60-90 days) to make efficient use of available server memory on an ongoing basis. An image file size is dictated in large part by the image resolution which is typically measured in units of pixels per area. Thus, the higher the resolution, the larger the file size. Furthermore, the larger the file size, the longer it takes a customer to upload the file to the photofinisher server. Additionally, more storage capacity is needed for the storage of higher resolution images. It would therefore be desirable from a customer satisfaction standpoint to require a high resolution image only when necessary for good image quality in the ordered print size and/or product.

SUMMARY OF THE INVENTION

The present invention successfully addresses the above need by providing an apparatus and method for an image communication system which requests from the customer a higher resolution data upload only when the original uploaded image is too low a resolution to achieve an acceptable image quality in the ordered print or other product bearing the image. In this regard, it is noted that the terms "photographs", "photos" and "prints" and the like as used herein include any products which embody the image such as, for example, shirts, hats, mugs, blankets, CDs, or any other item that may include images.

More particularly, a photofinisher may define predetermined ranges of print image sizes that are acceptable at a given resolution of the digital image file. For example, for smaller print sizes up to about 4×6 in size, a low resolution image file of about 1024×768 may be sufficient to generate an acceptable quality print. Likewise, for larger print sizes greater than about 8×10 in size, a high resolution image file of about 1250×1000 may be necessary to generate an acceptable quality print.

In a first aspect of the present invention, a digital image communication system is provided wherein a customer uploads one or more digital images in a first resolution image file to a photofinisher server which saves the image file in memory for a predetermined period of time. The customer may thereafter order prints of various sizes as desired. When an order is placed, the system compares the requested print size to the resolution of the saved image data file. If the print size is within the acceptable size or range of print sizes for that resolution, the order is processed and shipped or otherwise made available to the customer. If, however, the print size is outside the range of acceptable print sizes for that resolution, such as too low a resolution, the system notifies the customer of the out-of-range condition and gives the customer the option of uploading the same image in a higher resolution format which is inside the acceptable range whereupon the photofinisher processes the order using the high resolution data and ships or otherwise makes the processed order available to the customer.

According to another aspect, the present invention comprises a digital image communication system wherein a customer uploads one or more digital images in a first resolution format to a photofinisher server which saves the image file in memory for a predetermined period of time. The customer may thereafter order prints of various sizes as desired. When an order is placed, the system compares the requested print size to the resolution of the saved image data file. If the print size is within the acceptable range of print sizes for that resolution, the order is processed and shipped to the customer or otherwise made available to the customer. If, however, the print size is outside the range of acceptable print sizes for that resolution, such as too low a resolution, the system notifies the customer of the out-of-range condition and gives the customer the options of: 1) canceling the order; 2) proceeding with the order at the lower resolution (knowing that the print may not be of the highest possible quality); 3) changing the order to a smaller print size that is within the range of acceptable print sizes for that resolution; or 4) uploading the same image in a higher resolution format which is inside the acceptable range whereupon the photofinisher processes the order using the high resolution data and ships or otherwise makes the processed order available to the customer. The invention is not limited to a system which provides all four options described herein, but rather is applicable to a system having any one or more of the described options in any desired combination and in any order or manner of presentation to the customer.

In another, optional aspect of the present invention, the customer may upload one or more digital images to a server of the photofinisher which is then saved in the form of a virtual photo album. The customer may then invite friends and family (i.e., secondary customers) to view the virtual photo album whereupon they may order prints of varying sizes from the photofinisher. Should an order for a specific print size be outside the range of acceptable print sizes for the saved resolution of that image file, the secondary customer is so notified and given the options of: 1) canceling the order; 2) proceeding with the original order (knowing that the print image quality may not be of the highest possible quality); 3) changing the order to a print size which is within the acceptable range of print sizes for that resolution; or 4) requesting the primary customer to upload the image in high resolution and, upon upload, proceeding with the order using the high resolution data. Again, the invention is not limited to a system which provides all four options described herein to the secondary customer, but rather is applicable to a system having any one or more of the described options in any desired combination and in any order or manner of presentation to the customer.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Figure 1:
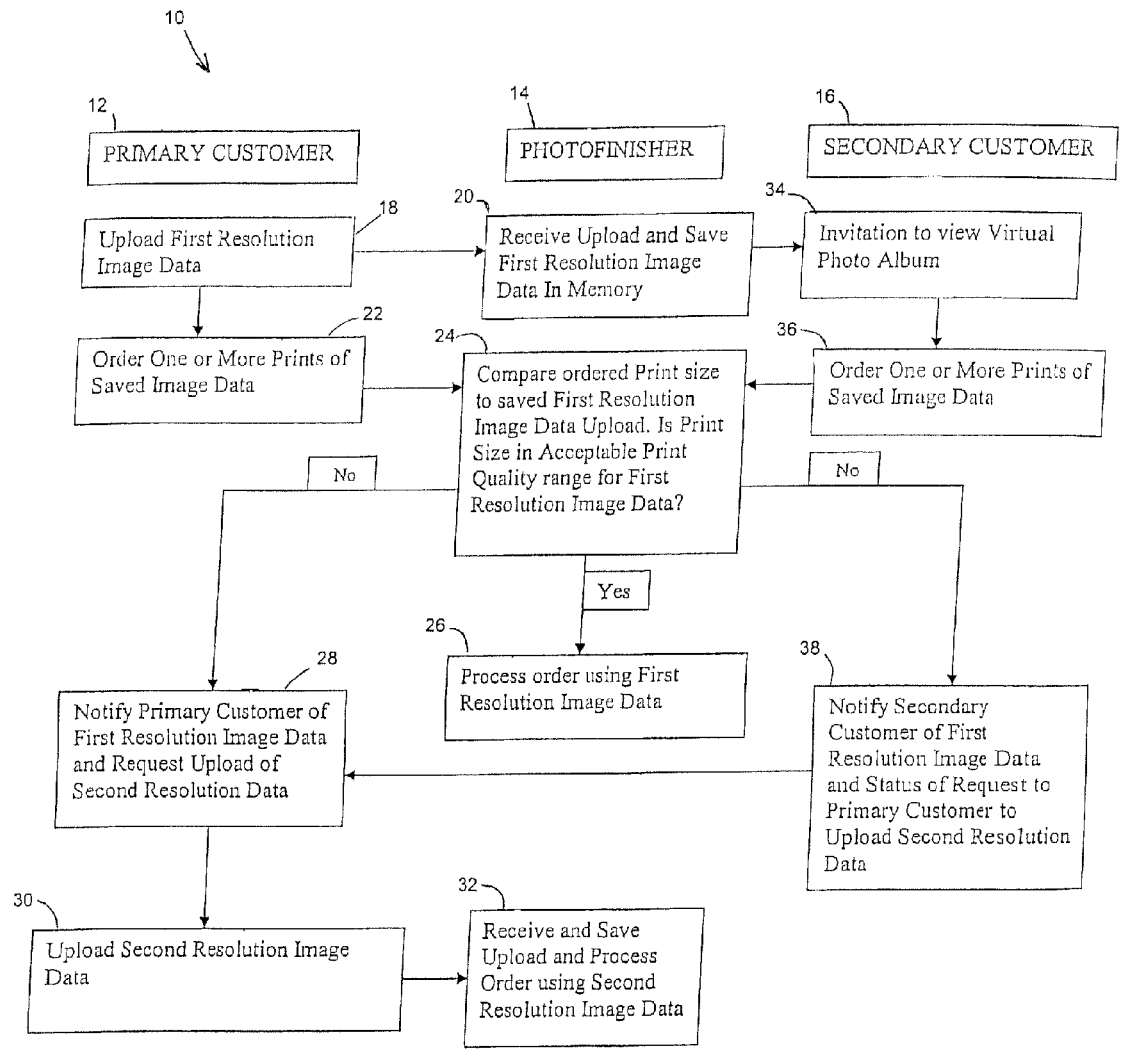
FIG. 1 is a flow diagram showing basic process flow steps in accordance with the present invention.

Referring to FIG. 1, the present invention will now be described with regard to the basic process steps of a digital image communication system indicated generally by reference numeral 10. System 10 may be embodied in a computer-readable medium or program having a set of computer-executable instructions for carrying out or performing the indicated digital communication between a primary customer 12 and a photofinisher 14. One or more secondary customers 16 may be optionally included within system 10 to allow these customers to view and order prints of the primary customer's images, which will be further explained below.

As best seen in FIG. 1, system 10 allows a primary customer 12 to upload and save one or more digital images to a server of the photofinisher as indicated at blocks 18 and 20, respectively. In general, the digital images may be uploaded to the server using a wireless transmission directly from the digital camera, a personal computer, scanner, photo kiosk, or the like. In addition, it will be understood and appreciated that the server may either be in a location that is local or remote from the location in which the orders are processed.

System 10 is configured such that the primary customer 12 may upload the digital images in a first or lower resolution format which takes less time to upload than second or higher resolution images. Within system 10, the photofinisher establishes a predetermined range of print sizes that would be of acceptable quality using the first resolution of the image data file. For example, print sizes from about 4×6 could be considered as being of acceptable quality for an image file of a first resolution. When the primary customer 12 places a print order of the saved image at block 22, system 10 includes a processor programmed to compare the requested print size to the resolution of the saved image data at block 24 and make a determination as to whether the requested print size is within or outside the acceptable range for the saved resolution image data. If the print size is within the acceptable range of print sizes for that resolution data, the order is processed and shipped or otherwise made available to the customer as indicated at block 26. If, however, the print size is outside the range of acceptable print sizes for that resolution, the system sends a signal that notifies the customer of the out-of-range condition at block 28, and requests that the customer upload the same image data file in a higher resolution format which is within the acceptable range for the requested print size. Upon the customer uploading the second resolution image file at block 30, the photofinisher receives and saves the upload and processes the order using the second resolution data at block 32.

Furthermore, the customer may upload one or more digital images to a server of the photofinisher in the form of a virtual photo album. The customer may then invite friends and family (i.e., secondary customers 16) to view the virtual photo album at block 34 whereupon they may order prints of varying sizes from the photofinisher as at block 36. As with the order placed by the primary customer 12, the processor in system 10 compares the requested print size of the secondary customer 16 to the range of acceptable print sizes for the resolution of the saved image file at block 24 and make a determination as to whether the requested print size is within or outside the acceptable range for the saved resolution image data. If the print size is within the acceptable range of print sizes for the saved resolution, the order is processed and shipped or otherwise made available to the secondary customer at block 26. If, however, the print size is outside the range of acceptable print sizes for the saved resolution of that image file, the secondary customer 16 is so notified at block 38. The system then also sends a signal that notifies the primary customer of the out-of-range condition at block 28. The system may advise the secondary customer as to the status of the upload request to the primary customer. Upon request, the primary customer may upload the image data file in the second resolution at block 30, and the photofinisher processes the order at block 32 and mails or otherwise makes available the processed print order to the secondary customer.

Figure 2:
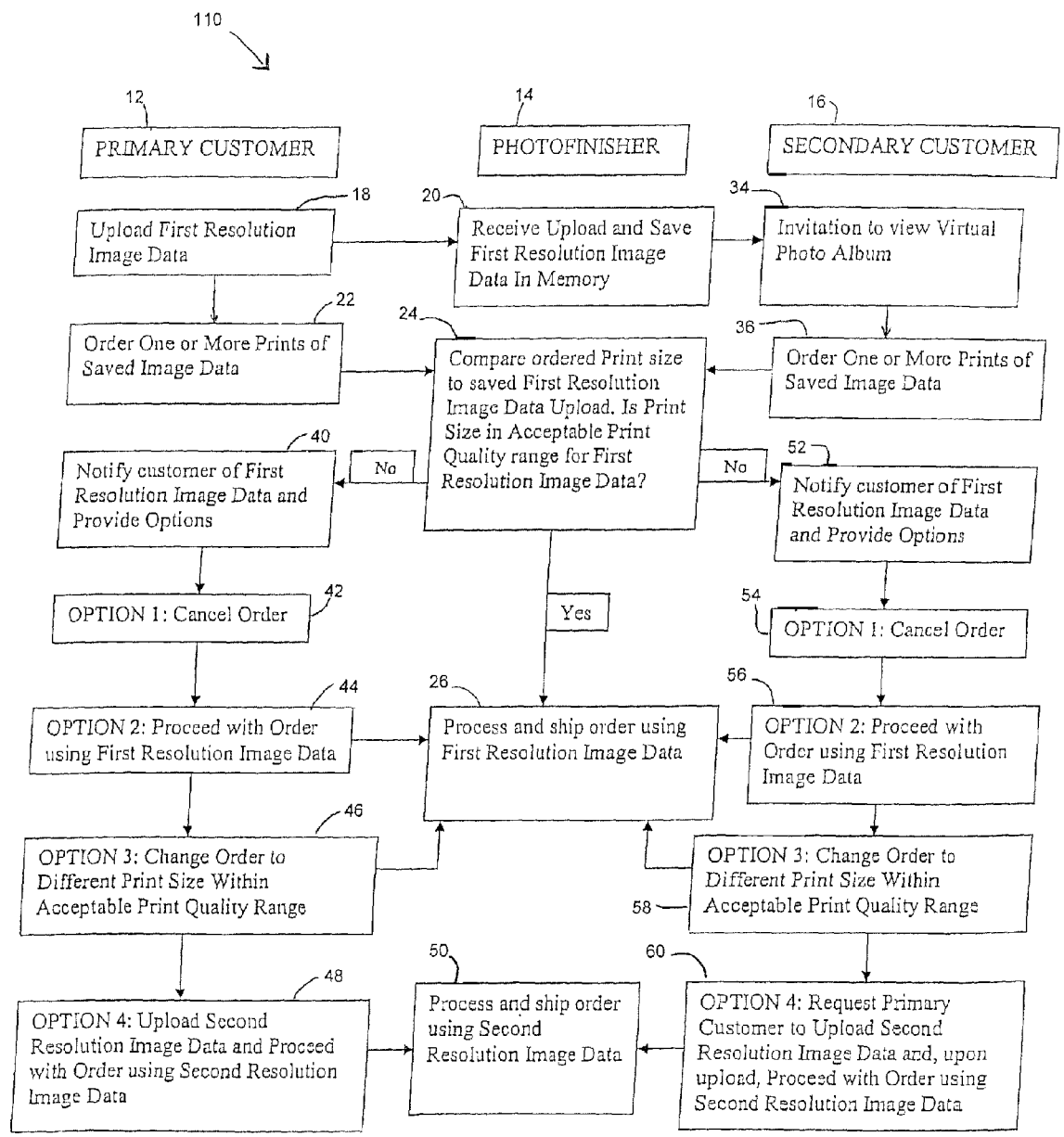
FIG. 2 is a flow diagram showing basic process flow steps in another aspect of the invention.

In another aspect of the invention as seen in FIG. 2, the primary customer 12 uploads one or more image data files in a first resolution as at block 18 which the photofinisher 14 receives and saves at block 20. The customer 12 may then order one or more prints of the saved image at block 22 whereupon the system 110 compares the requested print size to the first resolution of the saved image data at block 24 and make a determination as to whether the requested print size is within or outside the acceptable range for the first resolution data. If the print size is within the acceptable range of print sizes for that resolution, the photofinisher 14 processes and ships or otherwise makes available the prints to the customer at block 26. If, however, the print size is outside the range of acceptable print sizes for that resolution, the system sends a signal that notifies the customer of the out-of-range condition at block 40 and gives the customer the options of: 1) canceling the order at block 42; 2) proceeding with the order at the lower resolution knowing that the print may not be of the highest possible quality at block 44; 3) changing the order to a smaller print size that is within the range of acceptable print sizes for that resolution at block 46; or 4) uploading the same image in a higher resolution format which is inside the acceptable range at block 48 whereupon the photofinisher processes the order using the high resolution data at block 50 and ships or otherwise makes the processed order available to the customer. While four options are listed above, it is within the scope of the invention to offer a single option such as, "uploading the same image in a higher resolution format which is inside the acceptable range," or any of the above listed options alone or in combination.

In another, optional aspect of the invention seen in FIG. 2, the customer 12 may upload one or more digital images to a server of the photofinisher in the form of a virtual photo album as at block 20. The primary customer 12 may then invite friends and family (i.e., secondary customers 16) to view the virtual photo album at block 34 whereupon the secondary customers 16 may order prints of varying sizes from the photofinisher at block 36. As with the order placed by the primary customer 12, the processor in system 110 compares the requested print size of the secondary customer 16 to the range of acceptable print sizes for the resolution of the saved image file at block 24. Should an order for a specific print size be outside the range of acceptable print sizes for the saved resolution of that image file, the secondary customer 16 is so notified at block 52 and given the options of: 1) canceling the order at block 54; 2) proceeding with the original order at the lower resolution, knowing that the print image quality may not be of the highest possible quality at block 56; 3) changing the order to a print size which is within the acceptable range of print sizes for that resolution at block 58; or 4) requesting the primary customer to upload the image in high resolution at block 60 and, upon such upload, proceeding with the order using the high resolution image data at block 50.

It will be understood and appreciated that the method for digital image communication between a primary customer, a secondary customer and a photofinisher described above may be accessible to and executed by system 10, 110 in accordance with pre-programmed algorithms, execution instructions or sequences, computations, software code modules, interface specifications or the like. Further, the method performed by system 10, 110 may be implemented in a computing environment such as a personal computer (PC) or other computing device. Such computer may also include a storage device including volatile and nonvolatile, removable and non-removable media implemented in any method or technology for storing information such as program modules, data structures, computer readable instructions, or other data.

The computer storage media may include, but is not limited to, floppy disks, conventional hard disks, read only memory (ROM), random access memory (RAM), flash memory, electrically erasable programmable read-only memory (EEPROM), or other types of memory, magnetic cassettes, magnetic tape, magnetic disk storage or other magnetic storage devices, CD-ROM, digital versatile disks (DVD) or other optical disk storage, or any other medium which can be used to store the desired information and which can be accessed by system 10, 110.

System 10, 110 may also include communication media for sending and receiving signals, instructions or other parameters between the primary customer, the secondary customer, and the photofinisher. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. For example, communication media may include wired media such as a direct wired connection, and wireless media such as acoustic, radio frequency, infrared and other wireless media. It will be understood that combinations of any of the above should also be included within the scope of computer readable media.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method programmed for execution in a computing device for ordering digital prints, said method comprising:
   a) allowing a first customer to initiate an ordering process by first uploading at least one digital image having a first resolution;
   b) saving said at least one digital image of said first resolution to a memory of a server system;
   c) establishing a predetermined range of acceptable print sizes corresponding to said first resolution;
   d) providing an invitation to a secondary customer to enable access to said at least one saved digital image, wherein said secondary customer is different from said first customer;
   e) providing an ordering system allowing said first customer and said secondary customer to place an order for at least one print of a first size of said at least one saved digital image;
   f) in response to an order placed by said secondary customer, comparing in said server system, said first size to said predetermined range of acceptable print sizes;
   g) fulfilling said order if said first size is within said predetermined range of acceptable print sizes, and notifying said secondary customer if said first size is outside said predetermined range of acceptable print sizes;
   h) requesting that said first customer upload said at least one digital image in a second resolution higher than said first resolution to said server system, if said first size is outside said predetermined range of acceptable print sizes; and
   i) providing a status of said request to said secondary customer, and fulfilling said order utilizing said second resolution of said digital image if said first size is outside said predetermined range of acceptable print sizes after said first customer uploads said at least one digital image in said second resolution.

2. The method of claim 1, further comprising the step of allowing said ordering customer to cancel said order.

3. The method of claim 1 wherein said uploading of at least one digital image occurs over a network to a photofinisher.

4. The method of claim 1 further comprising:
   placing one or more of digital images uploaded by said first customer to said memory in a virtual photo album; and
   allowing said first customer to view said virtual photo album.

5. The method of claim 4 further comprising allowing said secondary customer to view the virtual photo album.

6. A non-transitory computer-readable storage medium having computer-executable instructions for performing a method comprising the steps of:
   a) providing means for a first customer to initiate the ordering process by first uploading to a server system, at least one digital image having a first resolution;
   b) saving said at least one digital image of said first resolution to a memory of said server system;
   c) determining a range of acceptable print sizes corresponding to said first resolution;
   d) providing an invitation to a secondary customer to enable access to said at least one saved digital image, wherein said secondary customer is different from said first customer;

e) providing an ordering system allowing said first customer and said secondary customer to place an order for at least one print of a first size of said at least one saved digital image;
f) in response to said order placed by said secondary customer, comparing said first size to said determined range of acceptable print sizes;
g) fulfilling said order if said first size is within said determined range of acceptable print sizes, or notifying said secondary customer if said first size is not within said determined range of acceptable print sizes;
h) requesting that said first customer upload said at least one digital image in a second resolution higher than said first resolution to said server system, if said first size is outside said determined range of acceptable print sizes; and
i) providing a status of said request to said secondary customer, and fulfilling said order utilizing said second resolution of said digital image if said first size is outside said determined range of acceptable print sizes after said first customer uploads said at least one digital image in said second resolution.

7. The system of claim 6 wherein said second resolution corresponds to a second predetermined range of acceptable print sizes.

8. The system of claim 7 wherein said customer uploads said digital image to said memory over the Internet.

* * * * *